United States Patent [19]
Daunt

[11] 3,796,553
[45] Mar. 12, 1974

[54] HIGH FIELD COMPOSITE SUPERCONDUCTIVE MATERIAL

[75] Inventor: John G. Daunt, Hoboken, N.J.

[73] Assignee: Research Corporation, New York, N.Y.

[22] Filed: Aug. 3, 1970

[21] Appl. No.: 60,359

[52] U.S. Cl. .............. 29/191.2, 29/182.1, 29/183.5, 29/191.4, 29/197, 29/199, 174/126 CP, 174/DIG. 6

[51] Int. Cl. .............................................. B23p 3/00

[58] Field of Search ....... 29/599, 182.1, 183.5, 197, 29/194, 199, 191, 191.2, 191.6, 191.4; 174/126 CP, DIG. 6

[56] References Cited

UNITED STATES PATENTS

| | | | |
|---|---|---|---|
| 3,317,286 | 5/1967 | DeSorbo | 29/194 X |
| 3,214,249 | 10/1965 | Bean et al. | 29/198 X |
| 3,301,643 | 1/1967 | Cannon et al. | 29/192 R X |
| 3,352,007 | 11/1967 | Charles | 29/599 |
| 3,196,532 | 7/1965 | Swartz et al. | 29/420 |

*Primary Examiner*—Charles W. Lanham
*Assistant Examiner*—D. C. Reiley, III

[57] ABSTRACT

Ductile composite materials which are superconductive and which exhibit high-field properties, and methods of making such composite materials. The composite materials are ductile at room temperature, can be easily fabricated into coils, and can carry supercurrents at high current densities and in high fields. The composite materials are thermally and electrically stabilized and are in the form of a sponge-like matrix of a first metal characterized by ductility and good thermal conductivity. The continuous network of voids in the matrix is infiltrated with a continuous network of multiply connected filaments of a ductile superconductor. The average thickness of the superconducting filaments is of the order of magnitude of 100 Angstrom units or less. The composite materials are made by preparing a porous matrix of the ductile and thermally conductive metal, then infiltrating the voids in the matrix with a ductile superconductor, then reducing the infiltrated matrix, as by drawing, until the average thickness of the superconductor filaments is within the desired range. Certain properties of the composite materials are improved by precipitation hardening of the superconductor and by twisting.

15 Claims, 4 Drawing Figures

INVENTOR.
JOHN G. DAUNT
BY
Ivan S. Kavrukov
Thomas J. [illegible]
ATTORNEY

HIGH FIELD COMPOSITE SUPERCONDUCTIVE MATERIAL

BACKGROUND OF THE INVENTION

The invention is in the field of superconductive materials which can be in the form of superconducting wire, ribbon or cable suitable for high-field, high-current operation and concerns additionally methods of making such superconductive materials.

Superconductivity is a property of certain metals, metallic alloys, and compounds at temperatures near absolute zero by virtue of which property the electrical resistivity substantially disappears. Superconductivity is utilized in equipment such as high-field, loss-free magnets, ultra-sensitive voltmeters, cavities for linear accelerators, etc. The future uses of high-field superconducting magnets in particular will become important, both in research and in industry, as for example in particle accelerators and their associated equipment, in plasma containment for nuclear fusion and in electric power equipment including magnetohydrodynamic power generators.

To date some twenty-five elements and several hundred metallic compounds and alloys have been found to be superconducting below a critical transition temperature characteristic of each material. In general, the bahavior of superconductors can be sub-divided into two classes known as Type I and Type II. Representative Type I behavior is found in pure, generally soft, metallic elements such as lead, mercury, tin, indium, gallium and zinc. These revert to the normally conducting state at characteristically relatively low intensity externally applied magnetic fields. For example, the maximum field which lead can withstand without reverting to the normally conducting state is approximately 800 gauss. Type II superconductors are generally transition elements, intermetallic compounds and alloys. Type II behavior, showing a "mixed-state" in applied magnetic fields, is very characteristic of alloys. This is so even if the components of the alloy may in their pure phases be Type I superconductors. Type II superconductors remain superconducting in higher magnetic fields, in general, than Type I. For example, metallic alloys and compounds have been found which remain superconducting, i.e. their resistivity remains zero, in very intense magnetic fields. Magnets with Nb-Zr alloy wire have been made to produce magnetic fields greater than 60 kilogauss without "quenching" into the normal state. Wire of Nb-Ti alloy has been used to construct solenoidal magnets giving fields up to 85 kilogauss and ribbon containing $Nb_3Sn$ has been used for magnets giving fields over 100 kilogauss. These alloys and compounds are examples of Type II superconductors which are made strongly non-ideal by the inclusion of a high density of physical, chemical and structural defects.

In many uses of superconductivity it is desirable that the superconductor be mechanically soft so it can be easily formed into wires, ribbons, coils, etc., but that it remain superconductive in high magnetic fields. In particular, for use in making high-field magnets it is desirable to have material, preferably in the form of wire, ribbon or cable, which will remain superconducting in high magnetic fields, which will carry a current density at least in the range $10^4$ to $10^5$ amps/cm$^2$ and which is capable of being made into a magnet. The second of these requirements, namely the lower limit on the critical current density, is to permit the magnet to have a reasonable physical size. A desirable combination of characteristics is (1) the mechanical softness and/or ductility of those pure elements which are of Type I or of their alloys which are of Type II and (2) zero resistivity in high magnetic fields customarily associated with alloys or compounds showing strongly non-ideal Type II behavior.

For the understanding of the subject invention it is necessary to consider two important factors. The first concerns the question of whether it is absolutely necessary to start with a Type II superconductor in order to produce a material with superconducting properties in intense magnetic fields. The answer is that it is not. In this regard the discovery of Bean and co-workers (U.S. Pat. No. 3,214,249) is cited. They describe a composite superconducting body comprising a porous matrix of a non-metallic material such as glass having voids that are interconnected by narrow channels. The average diameter of the voids is less than the bulk penetration depth and bulk mean free path of a particular pure superconducting element showing Type I behavior, and this pure superconducting element is infiltrated into the voids as a continuous network of multiply connected filaments. The resulting composite superconducting material exhibits some of the desirable properties typically associated with non-ideal Type II superconductors, i.e. the critical magnetic field required to revert the composite material to its normally conducting state is considerably higher than the magnetic field which would be required for the same Type I superconductive in bulk form, and the critical current densities are high. Similar work, but with infiltration of porous glass with lead-bismuth alloys (which are Type II superconductors in bulk form) has been carried out by Watson: see J.H.P. Watson, Appl. Phys. Letters 16:428 (1970).

The second factor concerns the fact that bulk alloys or compounds of a soft Type I superconductors are Type II superconductors, which show higher critical magnetic fields than the pure material itself. It is of interest to note that the earliest work on high-field superconductors was on such materials. de Haas and Voogd (Comm. Leiden Lab. No. 208b, 1930) studied Pb-Bi alloys in 1930 and found, for example, that a Pb-Bi alloy with 33% Bi showed zero resistance in fields up to 16 kilogauss at 4.2°K and up to 22.5 kilogauss at 1.91°K. Kunzler much later (Rev. Mod. Phys. 33, 501, 1961) reported that Pb-Bi alloys can sustain moderately large current densities, e.g. $3 \times 10^3$ amps/cm$^2$ at 15 kilogauss and 1.5°K. It is clear for example, therefore, that Pb-Bi alloys in bulk can behave as moderately high-field high-current materials. The use of such alloys in filamentary networks of very small dimensions therefore yields yet more desirable properties.

In general, the magnitude of the upper critical magnetic field ($H_{c2}$) for these systems is given by:

$$H_{c2}(t) = (3/2\,\pi^2)\Phi_o\, U(t)/\xi l$$

where $t = T/T_c$, in which $T_c$ is the transition temperature, $\Phi_o$ is the elementary quantum of flux ($2.07 \times 10^{-7}$ gauss-cm$^2$); $U(t)$ a universal function such that $U(t) = 1$ for $t = 0$; $\xi_o$ is the bulk coherence length and $l$ is the electronic mean free path. It is to be noted that the product $\xi_o l$ defines an effective coherence length, $\xi_{eff}$ such that $\xi_{eff}^2 = \xi_o l$ : The attainment of high critical fields for these systems therefore is largely due to reduction in the effective coherence length, $\xi_{eff}$. This is done by reducing $\xi$ for example by alloying and by reducing $l$ for example by reducing the dimensions of the superconducting network and by other scattering processes. Furthermore, high critical currents are attained in mixed-state of Type II materials by the introduction of as large a number of pinning sites as possible. This is done by the production of large numbers of physical and chemical defects, making the material non-ideal.

It has also been discovered that the characteristics of superconducting wire are improved if the wire is coated with or embedded in copper or in any other normally conducting material having high thermal conductivity. The surrounding normal material acts as an insulator between windings (since it remains normally conductive while the superconductor conducts supercurrent) and also acts as a stabilizer because it distributes quickly over a finite volume the heat which is developed locally if a small element in the wire fluctuates into the normally conducting state. Normal material stabilization of superconducting wire is discussed in David Fishlock, A Guide to Superconductivity, 1969, p. 65. This normal material cladding can be done in many ways; in some cases multiple, parallel superconducting wires are drawn inside a copper matrix to form a ribbon or wire of many parallel separate superconducting strands. This process of stabilization helps construct reliable superconducting magnets. A particular example of such stabilization is shown in Garwin et al., U.S. Pat. No. 3,366,728, which describes a cable comprising filaments of a superconductor such as lead, each filament enclosed in a sleeve of normal metal such as aluminum, and a bundle of such individually sleeved filaments enclosed in a common sleeve of normal metal. The size of the individual superconductor filaments in the Garwin patent may be substantially less than the penetration depth of the superconductor. All filaments in the Garwin patent are of approximately regular cross-section and are "insulated" from each other by normal metal; there is no direct connection between any two filaments.

Another patent relating to filamentary networks of superconductors is Swartz et al., U.S. Pat. No. 3,196,532, which describes a matrix of powder of a metal such as columbium, molybdenum of vanadium infiltrated and reacted with a continuous filamentary network of a second metal such as tin, aluminum or rhenium. The patent does not relate to superconducting filaments whose average diameter is less than the penetration depth for the superconductor, and thus does not relate to composite superconducting structures which exhibit high-field properties because of their small dimensions. The patent moreover is restricted to reaction products formed from the component materials.

SUMMARY OF THE INVENTION

The invention relates to composite superconductive materials which may be in the form of wires, ribbons or cables, and which comprise a soft ductile superconducting material embedded in the form of a multiply connected filamentary network in a thermally conducting matrix, which composite superconductive material exhibits the desirable properties of high-field, high-current superconductors, and to methods of making such composite materials. The network of multiply connected filaments of the superconductor has an average thickness not only less than the penetration depth of the superconductor in bulk but also sufficiently small to reduce the effective coherence length to values smaller than the effective coherence length in the bulk superconductor. In addition, the superconductor filaments are of irregular thickness.

Irregularity in the filament thickness is advantageous, because it reduces the effective means free path of the filament material and enhances an increase in the critical magnetic field in which the composite material reverts completely into normally conducting state. The metal forming the matrix is chosen not only to be ductile so that the resultant structure can easily be fabricated into wire, ribbon or other shapes suitable for particular uses such as magnet winding but also so that it can serve as stabilizer for the superconductor. It must therefore have high thermal conductivity. Metals such as copper or silver are particularly useful. It is possible, moreover, to use even a superconductor having good thermal conductivity, such as aluminum, as the matrix material.

The superconducting material is chosen for good ductility and for reasonably high transition temperature; lead and alloys of lead such as Pb-Bi are particularly useful, although any other known superconductor having the desirable metallurgical properties may be used.

The invented composite material is made by preparing a porous matrix of the first metal, then infiltrating the multiply connected voids of the matrix with the superconductor, and then reducing the average superconductor filament thickness to the desired value which is typically of the order of magnitude of 100A or less. The porous matrix of the first metal may be prepared by packing together powder of the metal, with the optional step of sintering the powder to provide metallic bridges between individual powder particles. The superconductor may be infiltrated into the porous matrix by immersing the porous matrix into the superconductor in the molten state and allowing infiltration at suitable temperatures and pressures. After adequate infiltration, the infiltrated matrix is cooled to solidify the superconductor and then the average filament thickness is reduced to the desired range by processes such as drawing, swaging or rolling the infiltrated matrix. If the porous matrix is not sintered, a sleeve of ductile material is used to contain the infiltrated matrix. The superconductor may include a precipitation hardening component serving to stabilize physical defect in the superconductor filaments. The composite material may be twisted to generate additional physical defects.

It is an object of the invention to achieve a high-field superconducting material which may be in the form of wire, ribbon or cable and which is "stabilized", that is to say which is inherently stable against random fluctuations of parts of the superconducting winding into the normal (or resistive) state.

It is also an object of this invention to provide a method of fabricating high field superconducting material which can be in the form of wire, ribbon or cable by using economical and readily available materials, which are ductile and fabricated easily into magnet windings.

Another object of the invention is to permit the use of soft or Type I superconductors and/or their alloys (the alloys, in bulk, being of Type II) in such superconducting wires, ribbons or cables, which, because of the novel method of fabrication yield "high-field" superconducting behavior.

BRIEF DESCRIPTION OF THE DRAWINGS

FIG. 2 illustrates a porous matrix of sintered metal powder, with metallic bonds between powder particles.

DETAILED DESCRIPTION

The desirable properties which the invented composite material combines are stabilized high-field, high-current behavior of the kind typically associated with stabilized non-ideal Type II superconductors and ductility and other metallurgical properties of the kind typically associated with Type I superconductors. The Type II magnetic properties are desirable because superconducting wire with such properties can be used in magnet and motor coils operating in fields of the order of 50,000 gauss to over 100,000 gauss. The ductility and other metallurgical properties of, for example, Type I superconductors are desirable for the purpose of easily forming superconductive wire into coils and other shapes required for various uses. Thermal and electrical stabilty is desired to alleviate problems such as quenching, charging and flux-jumping.

Figure 1:
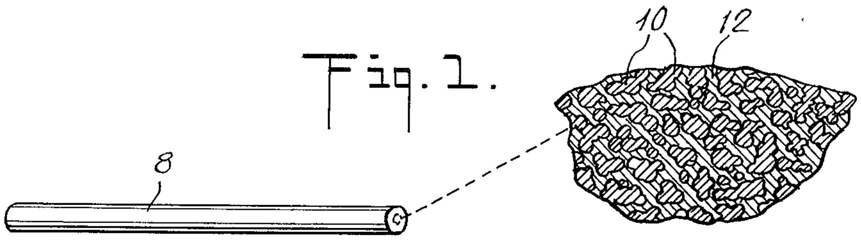
FIG. 1 shows wire made of the invented composite material and illustrates in an exploded sectional view the distribution of superconductor filaments in a metallic matrix.

The desirable properties of high-field, high-current superconductivity, ductility and the desirable property of providing thermal and electrical stability, are combined according to the subject invention in a composite material illustrated in FIG. 1 in the form of a cylindrical wire. The composite material of which the wire is made includes a first metal which has high thermal conductivity, and a ductile superconductor. The first metal is in the form of a porous matrix having a continuous network of interconnected voids, and the superconductor is in the form of a multiply connected continuous filamentary network of iiregular thickness of the filaments, which network is infiltrated into the voids of the first metal. In the cross-sectional illustration of FIG. 1 the first metal is identified by the reference number 10 and the filamentary network of the superconductor is identified by the reference number 12. The composite material is shown in perspective as a wire 8.

The first metal 10 is a suitable element or alloy characterized by good thermal conductivity; metals such as copper or silver, in elementary form, are particularly useful. The first metal may be a known superconductor, such as aluminum, provided it is normal at the operating temperature of the composite material, as long as the first metal has much higher thermal conductivity than the superconductor infiltrated into the voids of its matrix. Metals such as copper, aluminum, gold and silver and alloys and combinations thereof are also particularly useful.

The superconductor 12 infiltrated into the voids of the first metal 10 may be any suitable ductile superconductor having a relatively high transition temperature. Superconductors which are particularly useful are pure lead, lead alloyed with bismuth or titanium, and other alloys of lead. Other suitable superconductors are tin and alloys of tin, and indium and alloys of indium.

A necessary condition for the proper operation of the invented composite material is that the average thickness of the superconducting filaments must not only be less than the penetration depth for the superconductor in bulk but also must be sufficiently small to reduce the effective coherence length of the superconductor in filamentary form to values less than the effective coherence length of the superconductor in bulk. The necessary condition is satisfied when the average thickness of the superconducting filaments is of the order of magnitude of 100 Angstroms or less. When this necessary condition is satisfied, the filamentary form of the superconductor behaves as a Type II superconductor in that it exhibits mixed state superconductivity, the current density averaged over the entire cross-section of the superconductor is higher than for the same superconductor in bulk form and the second critical magnetic field in which the superconductor reverts completely into normally conducting state is higher than the critical magnetic field in which the same superconductor in bulk form reverts completely into normally conducting state. The desirable high critical current properties of the filamentary superconductor are further enhanced when additional dislocations and impurities are caused by methods such as described later in this specification. The first metal which forms the matrix is in intimate electrical and thermal contact with the superconducting filamentary network and provides thermal and electrical stability which helps control quenching, charging and flux-jumping. The matrix metal is protection in case of sudden transition of a filamentary region into the normally conducting state; in case of such transition the matrix provides an alternate current path and a heat sink.

The relative dimensions of the matrix walls and the filaments may vary widely between different sections of the composite material. Two geometry parameters are important and must be present: (1) the average thickness of the filaments must be within the desired range, and (2) the thickness of the filaments must be irregular. The irregularity in thickness reduces the mean free path of the filamentary superconductor and thus increases the critical field; further, the irregularity increases the filament surface which is in contact with the matrix metal and thus facilitates heat transfer.

One method of making the composite material illustrated in FIG. 1 involves preparing a porous matrix of the first metal 10, then infiltrating the voids in the matrix with the superconducting material 12 and then reducing the size of the resulting composite material until the average thickness of the superconducting filaments is in the aforesaid desirable range of the order of magnitude of 100 Angstrom units or less.

The porous matrix may be made by pressing together powder of the first metal 10, with the optional step of sintering the pressed powder. For example, copper powder of the type used in paints, with average particle size of less than 10 microns, may be packed together at several hundred atmospheres by the use of a conventional press as known in powder metallurgy. The resulting material is a porous matrix with voids of the order of microns. For the purpose of providing better mechanical, thermal and electrical bonds between individual copper particles, the pressed metal powder may be sintered at suitable temperature to provide metallic bond between the individual powder particles.

Figure 2:
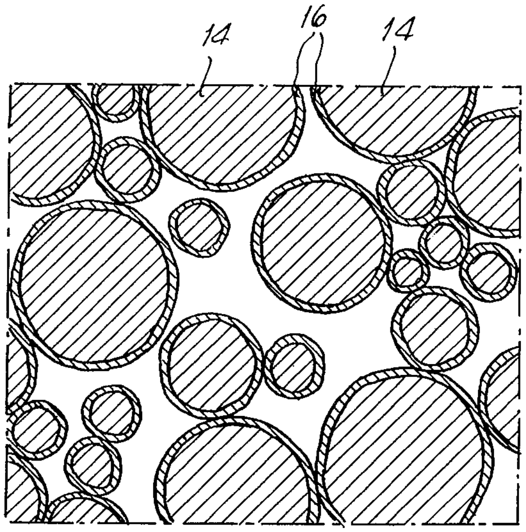
FIG. 2 illustrates metal powder packed together to form a porous matrix with interconnected voids.

FIG. 2 illustrates a plurality of copper particles 14, each covered with an oxide layer 16; the thickness of the oxide layer 16 is exaggerated. The particles are pressed together to form a porous matrix with voids 18. The porous matrix may be infiltrated with the superconductor at this time, or it may be subjected to the optional step of heating in atmosphere such as hydrogen and at temperatures below the melting point of copper for the purpose of sintering. When heated in the range of for example, 500° to 800° C. for a suitable period of time (as known in sintering metallurgy) the copper particles coalesce where they touch and provide one continuous sponge-like porous matrix, of the type shown in FIG. 3, which has metallic bridges between individual metallic particles and has good thermal and electrical conductivity.

Figure 3:
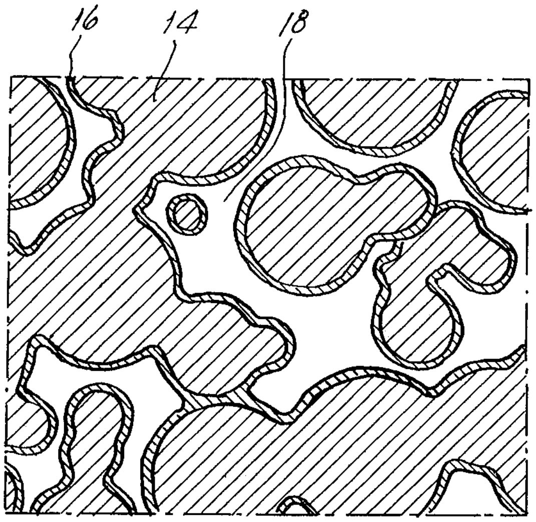
Figure 4:
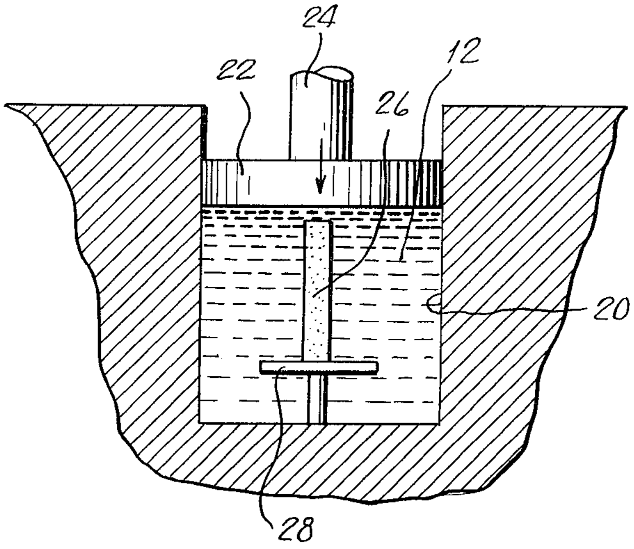
FIG. 4 is a sectional view of apparatus for infiltrating molten superconductor into the voids of a porous matrix.

Sponge-like metallic matrix either of the type shown in FIG. 2 or of the type shown in FIG. 3 may be infiltrated with a continuous network of multiply connected filaments of the superconductor by means of apparatus such as that shown in FIG. 4. The apparatus of FIG. 4 comprises a cylinder 20 having a tightly fitting piston 22 connected via a shaft 24 to a press (not shown) such as a conventional oil press capable of several hundred atmospheres of pressure. A sponge-like metallic matrix indicated at 26 is placed over a stand 28 supported at the bottom of the cylinder 20 and is surrounded by the superconductor 12 in the molten state but at temperature below the melting temperature of the matrix metal. Under pressure exerted by the piston 22, the molten superconductor infiltrates into the network of voids in the metal matrix 26 and forms a continuous network of multiply connected filaments having average thickness of the order of magnitude of microns. Adequate infiltration results from pressures of the order of a hundred atmospheres at (in the case of lead infiltrated copper matrix) 350°C. for about 1 hour.

After infiltration, the metallic matrix is allowed to cool for the purpose of solidifying the superconductor. At this time the average thickness of the superconducting filaments is greater than the desired size and the infiltrated matrix does not exhibit the desirable properties of high-field, high-current superconductors. In order to arrive at these desirable properties, the average thickness of the superconducting filaments must be reduced to an average thickness of the order of magnitude of 100 Angstroms units or less.

The reduction in average thickness can be carried out by drawing to accomplish diameter reduction of the infiltrated matrix 26 of about a few hundred to one. Other methods such as swaging and rolling, or various combinations of drawing, swaging and rolling may be employed for the purpose of reducing the average thickness of the superconducting filaments to the desired size. Average thickness is defined as the average, over a given volume of the infiltrated matrix 26, of the thicknesses of all superconductor filaments measured in a given direction.

It is noted that the acts of swaging, drawing or rolling develops physical defects in the superconducting filaments, which physical defects acts as pinning sites essential for high-critical current behavior. In order to stabilize these physical defects (or pinning sites) for the purpose of assuring longer useful life of the composite material, the superconductor which is infiltrated into the metallic matrix 26 may be an alloy containing a component suitable for precipitation hardening. A precipitation hardening step, of the type known in metallurgy, may be carried out after reducing the filament size to the desired range.

The purpose of the process described in connection with FIGS. 2, 3 and 4 is to form a composite material comprising a matrix of a first material infiltrated with a multiply connected filamentary network of a ductile superconductor having certain average thickness of the superconducting filaments, yet having an irregular structure. Various other methods may replace the method described above. Thus, the sponge-like matrix of the first metal may be prepared by other methods known in metallurgy. The matrix of the first metal may be infiltrated with the superconductor by other methods such as cold pressing. As still another alternative, an infiltrated matrix may be prepared by mixing powder of the first metal with powder of the superconductor with the optional step of sintering together the mix, and then reducing the average thickness of the superconducting filaments to the desired range. If sintering is not done, then the infiltrated matrix is held in a sleeve of ductile material.

Additional dislocations or physical defects which are desirable for high-field, high-current behavior may be introduced in the superconducting filaments by twisting elongated pieces of the invented composite material. A twist of several turns per inch is particularly suitable.

The invented composite material is ductile and may be easily fabricated into various particular shapes, such as wire, ribbon, multi-strand conductor, etc., by known technology. Wire, ribbon or cable of the composite material may be sheathed with ductile and thermally and electrically conducting material such as copper or aluminum for improved thermal and electrical properties.

I claim:

1. Composite material exhibiting superconducting properties at an operating temperature, comprising:

a. a porous matrix of a first metal which is not superconducting in bulk form at said operating temperature; and b. a multiply connected continuous filamentary network of a ductile superconductor metal infiltrated into said metal matrix and superconducting at said operating temperature, the average thickness of the filaments of said network being less than the penetration depth for the superconductor in bulk and sufficiently small to make the effective coherence length of the superconductor in filamentary form less than that of the superconductor in bulk, wherein the superconductor metal in said composite material remains distinct from the matrix metal and is not chemically combined or alloyed therewith.

2. Composite material as in claim 1 wherein the average thickness of the superconductor filaments is of the order of magnitude of 100 Angstrom units or less.

3. Composite material as in claim 1 wherein said first metal, although not superconducting in bulk form at said operating temperature, is classifiable as a superconductor in bulk form.

4. Composite material as in claim 1 wherein the thermal conductivity of the first metal is substantially greater than the thermal conductivity of the superconductor for the purpose of stabilizing the superconductor.

5. Composite material as in claim 1 wherein the first metal is selected from the group consisting of copper, aluminum, gold, silver, and alloys and combinations thereof.

6. Composite material as in claim 1 wherein the first metal is selected from the group consisting of copper, aluminum, gold, silver, and alloys and combinations thereof, and the superconductor is selected from the group consisting of lead, tin, indium, lead-containing alloys, tin-containing alloys, and indium-containing alloys.

7. Composite material as in claim 1 wherein the superconductor is selected from the group consisting of lead, tin, indium, lead-containing alloys, tin-containing alloys, and indium containing alloys.

8. Composite material as in claim 1 wherein the superconductor is an alloy including a precipitation-hardening component.

9. Composite material as in claim 1 wherein the filaments of said filamentary network are irregular in thickness.

10. Composite material as in claim 1 wherein the first metal is copper and the ductile superconductor is lead.

11. Composite material as in claim 1 wherein the first metal is copper and the superconductor is tin.

12. Composite material as in claim 1 wherein the first metal is copper and the superconductor is indium.

13. Composite material as in claim 1 wherein the first metal is aluminum and the superconductor is selected from the group consisting of lead, tin and indium.

14. Composite material as in claim 1 wherein the first metal is ductile and is characterized by high thermal conductivity at said operating temperature as compared with the thermal conductivity of the superconductor at said operating temperature.

15. Composite material exhibiting superconducting properties at an operating temperature, comprising:

a. a thermally stabilizing porous matrix of a ductile metal which is not superconducting in bulk form at said operating temperature and which is characterized by high thermal conductivity at said operating temperature; and b. a multiply connected continous filamentary network of a ductile superconductor metal infiltrated into said porous metal matrix and superconducting at said operating temperature, the average thickness of the filament of said network being of the order of 100 Angstroms, said composite material exhibiting Type 2 superconductor properties, and said superconductor metal remaining distinct from the matrix metal in the composite material.

* * * * *